US010281578B2

(12) United States Patent
Lekås et al.

(10) Patent No.: US 10,281,578 B2
(45) Date of Patent: May 7, 2019

(54) COMPENSATED DISTANCE MEASUREMENT METHODS AND APPARATUS

(71) Applicant: Trimble AB, Danderyd (SE)

(72) Inventors: Johan Lekås, Danderyd (SE); Set Svanholm, Sollentuna (SE); Alex Slawomir Kosakowski, Täby (SE)

(73) Assignee: Trimble AB, Danderyd (SE)

( * ) Notice: Subject to any disclaimer, the term of this patent is extended or adjusted under 35 U.S.C. 154(b) by 372 days.

(21) Appl. No.: 15/272,272

(22) Filed: Sep. 21, 2016

(65) Prior Publication Data

US 2017/0010357 A1    Jan. 12, 2017

Related U.S. Application Data

(63) Continuation of application No. PCT/EP2014/061105, filed on May 28, 2014.

(51) Int. Cl.
*G01S 17/10* (2006.01)
*G01S 7/486* (2006.01)
(Continued)

(52) U.S. Cl.
CPC ............ *G01S 17/10* (2013.01); *G01S 7/489* (2013.01); *G01S 7/4816* (2013.01);
(Continued)

(58) Field of Classification Search
CPC ...... G01S 7/4865; G01S 7/4868; G01S 7/489; G01S 7/497; G01S 7/4816; G01S 17/10
See application file for complete search history.

(56) References Cited

U.S. PATENT DOCUMENTS 7,492,303 B1 *   2/2009   Levitan ................... G01S 7/024
                                                              342/188
2004/0070746 A1   4/2004   Lewis et al.
(Continued)

FOREIGN PATENT DOCUMENTS

CN   101467001 A   6/2009
CN   101828128 A   9/2010
(Continued)

OTHER PUBLICATIONS

Hu et al. "A new time discrimination circuit for the 3D imaging lidar", Proceedings of SPIE, SPIE Remote Sensing , vol. 85381H, 2012.*
(Continued)

*Primary Examiner* — Eric L Bolda
(74) *Attorney, Agent, or Firm* — Kilpatrick Townsend & Stockton LLP

(57) ABSTRACT

A transmit light signal is emitted toward a target at an emission time. An optical subsystem of a receiving system receives a return light signal which is converted to a return electrical signal. At least one attenuator applies an attenuation to at least one of the return light signal and the return electrical signal. The attenuation varies, as time passes, after emission of the transmit light signal, according to a time-dependent attenuation function such that the attenuation is maximum at a critical time elapsed since an emission time of the transmit light signal. The critical time is dependent on at least one geometrical parameter of the optical subsystem. A receive time is determined from the return electrical signal. The emission time and the receive time are used to calculate a measured distance.

20 Claims, 17 Drawing Sheets

(51) Int. Cl.
　　　*G01S 7/497*　　　(2006.01)
　　　*G01S 7/489*　　　(2006.01)
　　　*G01S 7/481*　　　(2006.01)
(52) U.S. Cl.
　　　CPC .......... *G01S 7/4865* (2013.01); *G01S 7/4868* (2013.01); *G01S 7/497* (2013.01)

(56) References Cited

U.S. PATENT DOCUMENTS

2007/0121095 A1　　5/2007　Lewis
2012/0140203 A1　　6/2012　Gusev

FOREIGN PATENT DOCUMENTS

| CN | 102460209 A | 5/2012 |
| JP | 08-122435 A | 5/1996 |
| WO | 2008/089788 A1 | 7/2008 |
| WO | 2009/039875 A1 | 4/2009 |
| WO | 2014/032831 A1 | 3/2014 |

OTHER PUBLICATIONS

International Search Report for Application No. PCT/EP2014/061105 dated Jan. 30, 2015, 5 pages.
Written Opinion for Application No. PCT/EP2014/061105, dated Jan. 30, 2015, 6 pages.
Notification of Transmittal of the International Preliminary Report on Patentability, dated Aug. 5, 2016, 17 pages.

* cited by examiner

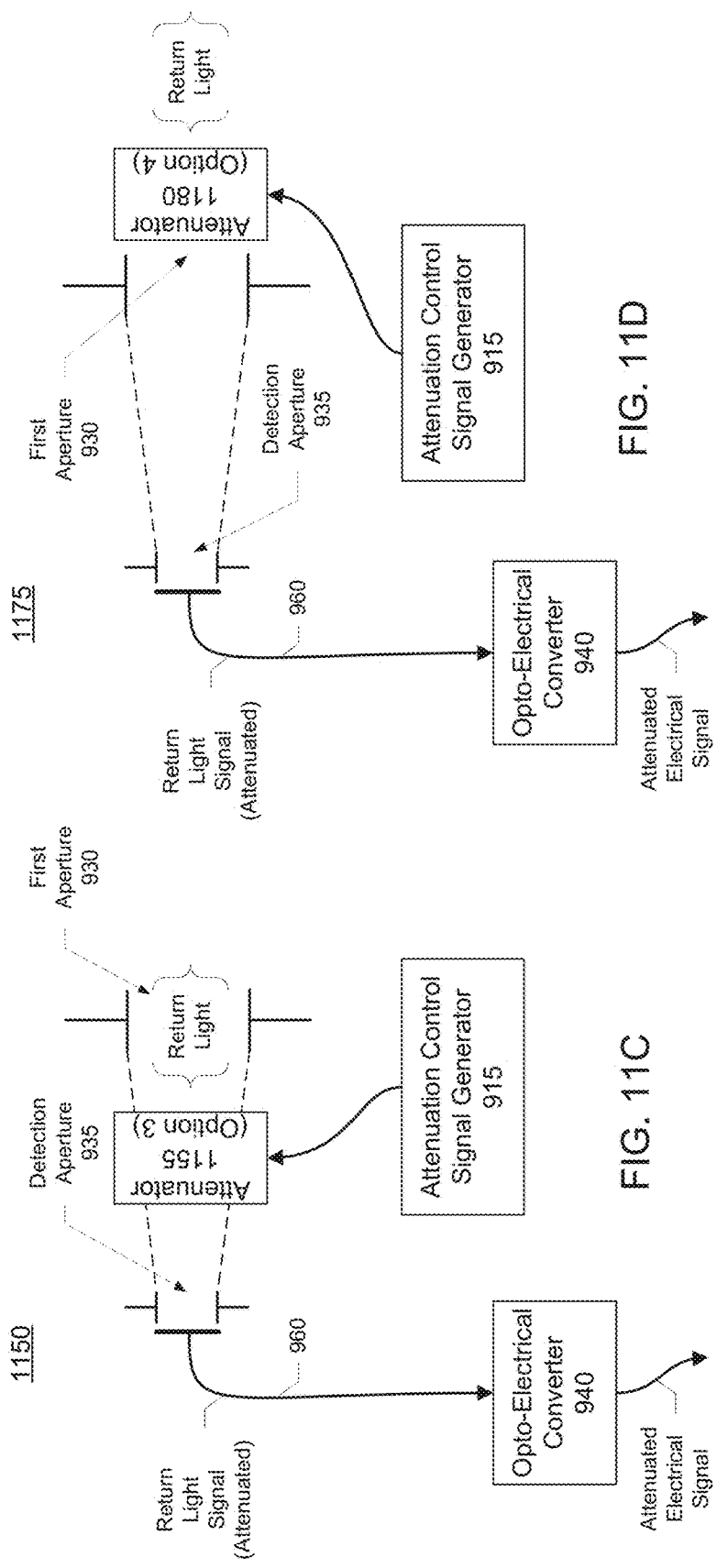

COMPENSATED DISTANCE MEASUREMENT METHODS AND APPARATUS

CROSS-REFERENCE TO RELATED APPLICATIONS

This application is a continuation of International Application No. PCT/EP2014/061105, filed May 28, 2014, the entire contents of which are incorporated herein by reference in their entirety for all purposes.

TECHNICAL FIELD

The present invention relates to the field of electronic distance measurement. More particularly, the present invention relates to methods and apparatus for electronic distance measurement with time-dependent attenuation to compensate measurement parameters.

BACKGROUND ART

Electronic distance measurement (EDM) units are used to measure distance to a target. In time-of-flight distance measurement, the time delay between emission and reception of a laser pulse allows for distance calculation. The emitted pulse travels to a reflector and back to a detector where it is received. The time delay is proportional to the pulse travel distance.

For a given reflector, the power level of the received pulse is assumed to be inversely proportional to the square of the pulse travel time (and the pulse travel distance) within a range of interest. The dynamic range of the power level of received pulses thus can be quite large.

To accommodate this dynamic range, prior art systems apply an attenuation function such that detection sensitivity increases over time following emission of a send pulse.

Typical prior art systems use an attenuation function based on a fixed function with fixed timing relative to the send pulse. U.S. patent application Ser. No. 13/597,295 filed 29 Aug. 2012 describes systems in which at least one of an attenuation function and an offset of the attenuation function relative to the send pulse is variable.

EDM units are used in surveying instruments such as total stations and stationary and mobile scanners. Total stations typically make distance measurements at a lower repetition rate than scanners, so that time is available to determine the amplitude of a return pulse and to set the attenuation of the detector circuitry.

Returning pulse amplitude is determined, for example, by sending a first pulse whose returning pulse amplitude is used to set the attenuation for the returning pulse of a subsequently emitted pulse directed at the same target. In some instruments a grey-wedge optical attenuator is adjusted over multiple measurement attempts until the return pulse signal is within a fixed receiver detection corridor.

Another approach is to set the attenuation level by predicting amplitude of a returning pulse based on prior distance measurements of nearby target locations, as described in WO 2008/089788 A1.

A further approach, described in WO 2009/039875 A1, is to split the return pulse signal, using one portion to set attenuation and delaying the other portion so that its amplitude is measured after the attenuation has been set.

Still, surveying instruments with improved compensation are desired to obtain a faster scanning and/or a more adapted dynamic range.

SUMMARY

Embodiments in accordance with the invention provide methods and/or apparatus for measuring distance. Such apparatus may be referred to as a surveying instrument in general, a geodetic scanner or a total station with a scanning function.

Some embodiments of the apparatus include a transmitter, a receiving system, at least one attenuator, a detection unit and a processor unit. The transmitter is operative to emit a transmit light signal toward a target at an emission time. The receiving system comprises an optical subsystem to receive a return light signal and an opto-electrical converter to convert the return light signal to a return electrical signal. The attenuator is configured to apply an attenuation to at least one of the return light signal and the return electrical signal. The attenuation varies, as time passes, after emission of the transmit light signal, according to a time-dependent attenuation function such that the attenuation is maximum at a critical time elapsed since the emission time of the transmit light signal. The critical time is dependent on at least one geometrical parameter of the optical subsystem.

The detection unit is configured to determine a receive time from the return electrical signal and the processor unit is configured to calculate a measured distance based on at least the emission time and the receive time.

In some embodiments, the optical subsystem of the receiving system may include a first aperture and a detection aperture. The critical time may then be dependent on at least one of the size of the first aperture, a size of the detection aperture and a distance from the first aperture to the detection aperture.

It will be appreciated that an amount of light reaching the first aperture from the target may be described by a first function dependent on distance between the first aperture and the target, and an amount of light passing through the first aperture reaching the detection aperture without applied attenuation may be described by a second function dependent on distance between the first aperture and the target. As a result of the combination of these two functions, the return light signal reaches a maximum at a specific (or critical) distance from the apparatus, which also corresponds to a critical time for the transmit light signal to travel from the transmitter of the apparatus to the target and back from the target to the optical subsystem of the receiving system of the apparatus. As mentioned above, the attenuation is therefore varied, as time passes, to reach after emission of the transmit light signal a maximum at a critical time elapsed since the emission time of the transmit light signal.

In particular, the critical time corresponds to a (critical) light travel distance (i.e. two times the distance between the apparatus and the target) for which a maximum amount of light is obtained at a detection aperture of the optical subsystem. In other words, a maximum return light signal is obtained for a specific position or distance of the target (at which the transmit light signal is reflected) to the apparatus.

The apparatus may further comprise a compensation element to reduce influence of at least one of the first function and the second function on the return electrical signal.

In some embodiments, the attenuation increases since the emission time of the transmit light signal up to the critical time. Thus, although the dependence of the intensity of the return light signal is, in general, inversely proportional to the square of the distance between the target and the apparatus (or inversely proportional to the travelling time of the transmit light signal between the target and the apparatus), the inventors have realized that the intensity or power level of the return light signal (and thus the return electrical signal) first increases up to a critical distance to reach a maximum. Thus, instead of decreasing the attenuation of the power of the return light signal (or the return electrical signal) directly after emission of the transmit light signal, the attenuation will be increased until the critical time is reached. For example, the critical time may be in the range of approximately 0.1 to 0.5 microseconds, which corresponds to a critical distance to the target of approximately 15 to 75 meters.

In some embodiments, the attenuator is configured such that the attenuation of at least one of the return light signal and the return electrical signal decreases after the critical time. Beyond the critical distance (i.e. for larger distances), the return light signal will be mainly affected as a function of the inverse of the square of the distance.

In some embodiments, an optical element may be arranged at the first aperture to direct the return light signal on a detector arranged at the detection aperture. The critical time may be dependent on the characteristics of such an optical element and any other optical elements arranged within the optical subsystem of the receiving unit or on the optical path of the return light signal. The critical time is therefore specific to a particular apparatus and, more specifically, to the optics in the receiving unit of the apparatus.

The embodiments described herein provide for an improved compensation such that the optics-dependent variation of the power level of light received from a target is reduced.

In some embodiments, the apparatus may further comprise a calibration unit for determining the critical time during a calibration procedure. The calibration procedure may take place in factory or in the field and may be performed for a basic configuration of the optical subsystem. The calibration procedure may also be performed in the field in order to take into account any addition of optical elements in the optical subsystem or in the optical path of the return light signal as compared to the basic configuration, i.e. for any new configuration of the apparatus.

In some embodiments, the transmit light signal comprises at least one light pulse. In some embodiments, the transmit light signal comprises multiple light pulses.

In some embodiments, the apparatus may further comprise a controller configured to regulate the attenuation of the attenuator for a travelling transmit light signal (e.g. a light pulse), as time passes, from a time event related to the emission of the travelling transmit light signal until reception of the return light signal corresponding to the travelling transmit light signal or until emission of a subsequent transmit light signal or until a time period elapsed since the time event related to the emission time exceeds a threshold. The time event may be the emission of the light pulse itself but may also be the reception of a reference pulse or another signal related to the emission of the light pulse, such as part of the light pulse being reflected in another direction than towards the target.

The attenuator may for example be regulated for a travelling light pulse from the time it is emitted until it returns for measurement of the distance associated with this specific light pulse using the time-dependent attenuation function.

For this purpose, the apparatus may include a controller adapted to cause an attenuation control signal generator to produce time-dependent attenuation control signals using the time-dependent attenuation function. The attenuation control signals may therefore be related in time to the emission time.

In some embodiments, the apparatus may further comprise a correction unit for compensating the return electrical signal for at least one environmental parameter.

In some embodiments the processor unit may be operative to correct at least one of the receive time and the measured distance for a time shift of the receive time resulting from appliance of the attenuation on at least one of the return light signal and the return electrical signal by the attenuator.

Some embodiments further include a signal delay module operative to delay a portion of the return electrical signal for a predetermined time, a signal analyzer operative to generate an intensity signal indicative of an intensity of the return electrical signal, and a variable gain amplifier operative to amplify the delayed portion of the return electrical signal using a gain dependent on the intensity signal, and the detection unit is operative to determine a receive time from the return electrical signal by determining the receive time from the delayed portion of the return electrical signal after amplification by the variable gain amplifier.

In some embodiments the attenuation function is modified for a current distance measurement using information from a previous distance measurement.

In some embodiments a time-dependent attenuation control signal may be produced to control the attenuator based on the time-dependent attenuation function. The attenuation control signals may be dependent upon a parameter of a prior measurement.

Some embodiments of the method include emitting a transmit light signal toward a target at an emission time, receiving by an optical subsystem a return light signal, converting the return light signal to a return electrical signal, regulating an attenuation level of an attenuator for applying an attenuation to at least one of the return light signal and the return electrical signal, determining a receive time from the return electrical signal, and calculating a measured distance based on at least the emission time and the receive time.

The attenuation is regulated, as time passes, after emission of the transmit light signal, according to a time-dependent attenuation function such that the attenuation is maximum at a critical time elapsed since the emission time of the transmit light signal. The critical time is dependent on at least one geometrical parameter (or geometrical parameters) of the optical subsystem.

Other embodiments using all possible combinations of features recited in the above described embodiments may be envisaged. In particular, it will be appreciated that the features of the embodiments described with reference to the apparatus may be combined with any embodiment described with reference to the method and vice versa.

BRIEF DESCRIPTION OF DRAWINGS

These and other aspects and features of the present invention will be more readily understood from the embodiments described below with reference to the drawings, in which:

FIG. 11C shows a third attenuation configuration in accordance with an embodiment of the invention;

FIG. 11D shows a fourth attenuation configuration in accordance with an embodiment of the invention;

DETAILED DESCRIPTION

Figure 1:
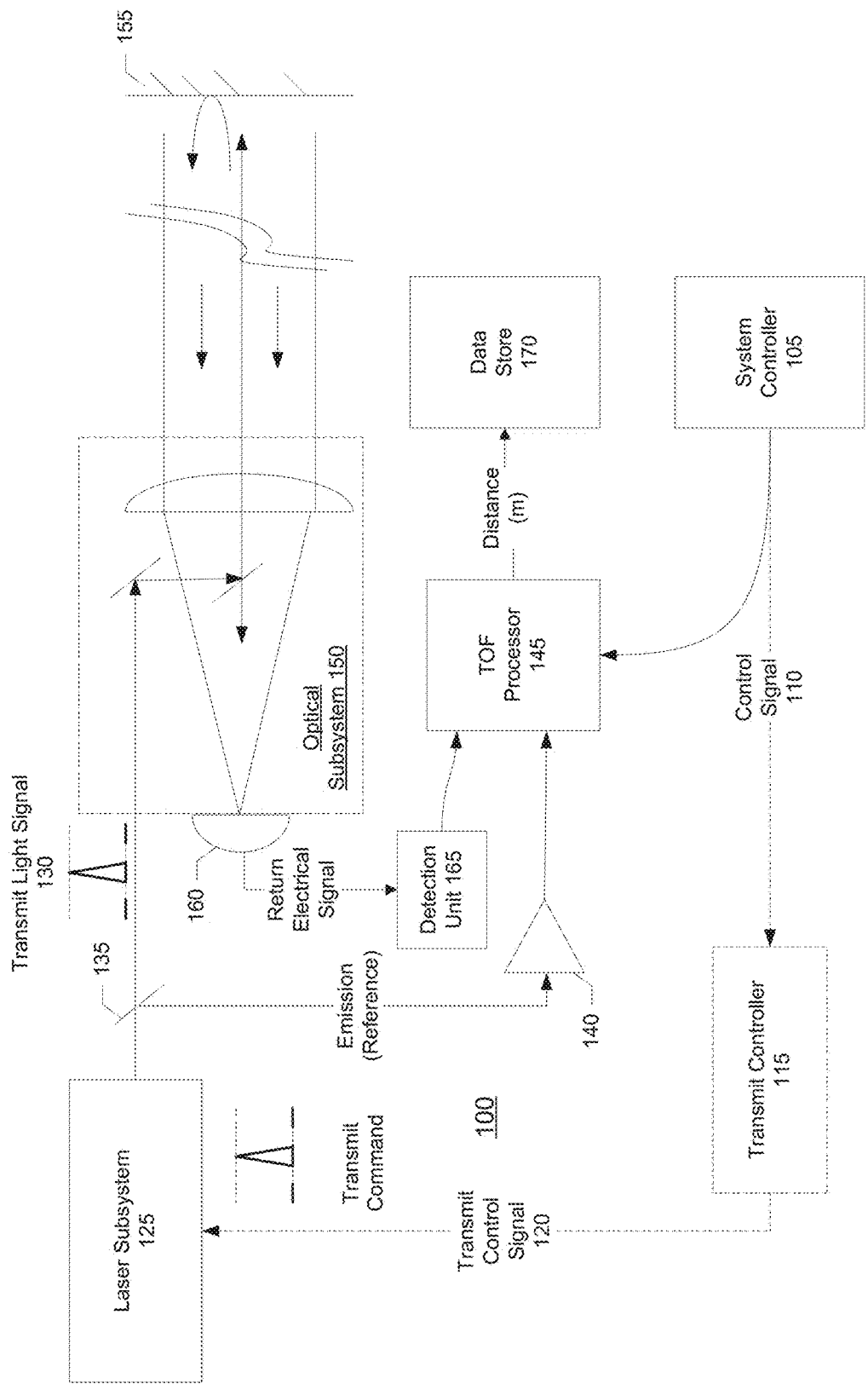
FIG. 1 schematically illustrates a distance measurement system in which embodiments of the invention can be implemented.

FIG. 1 schematically illustrates a distance measurement system 100 in which embodiments of the invention can be implemented. A system controller 105 may communicate via control signals 110 with a transmit-signal controller 115 to coordinate system operation. System controller 105 issues a control signal 110 to transmit-signal controller 115 to start a measurement. Transmit-signal controller 115 issues a transmit-pulse control signal 120 to a laser subsystem 125. Laser subsystem 125 responds by emitting a transmit light signal 130. Transmit light signal 130 can be a single pulse, as illustrated, or a set of pulses or other signed pattern such as described in International Patent Application Publication WO 2013/030651 A1.

Transmit light signal 130 passes through a splitter 135. A portion of the energy from transmit light signal 130 passes to a detector element 140 to provide an emission time reference to time-of-flight (TOF) processor 145 for the transmit light signal 130. A portion of the energy from transmit light signal 130 passes through an optical subsystem 150 and is directed at a target 155 external to the system 100. The return light signal from target 155 passes through the optical subsystem 150 to an opto-electrical converter 160. Opto-electrical converter 160 provides a return electrical signal to a detection unit 165. Detection unit 165 determines a receive time from the return electrical signal.

TOF processor 145 determines a corresponding time of flight for laser pulse 130 and converts the resulting time-of-flight value to a corresponding measurement distance that is, for example, stored in a data store 165. The time-of-flight processor 145 may be a separate processor, or may be a process running in a computer which also runs the process of system controller 105 and/or pulse controller 115 and/or other processes. Functionality is described here with reference to particular elements of FIG. 1 for convenience of illustration, but can be combined in one or more elements or assigned to other elements as may be convenient.

Transmitter 125 is optionally a free-running laser system that emits transmit light signals without a transmit command. Control signal 110, transmit controller 115 and transmit control signal 120 are shown in dashed lines to indicate that these are not required if transmitter 125 is free-running.

Figure 2:
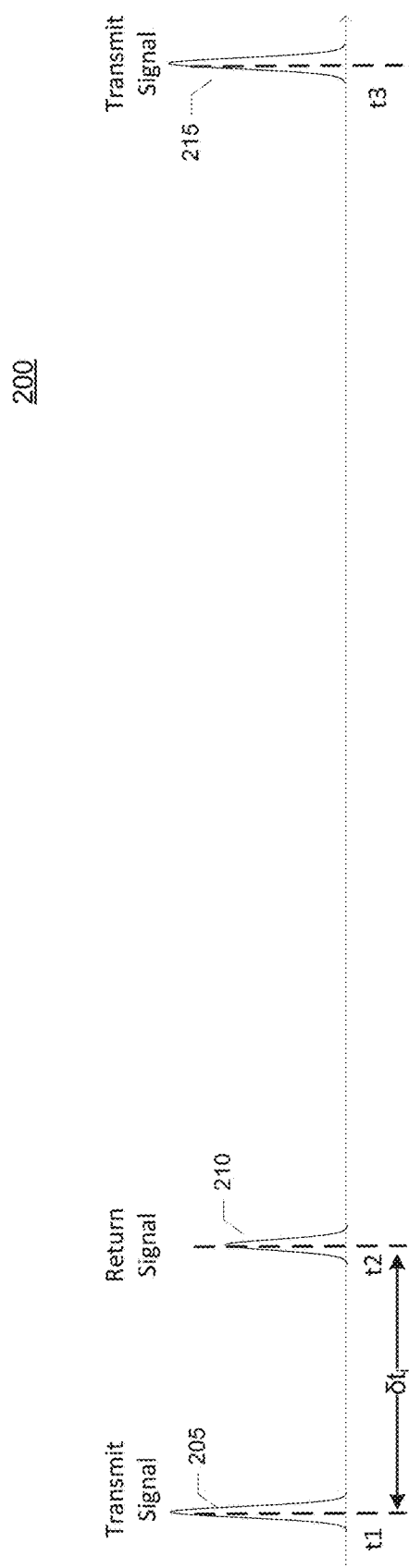
FIG. 2 shows a timing diagram of a distance measurement in accordance with some embodiments of the invention.

FIG. 2 shows at 200 a timing diagram of a distance measurement in accordance with some embodiments. Time t1 is the emission time of a transmit light signal 205 such as a light pulse for a measurement. Time t2 is the receive time of the corresponding return light signal 210 (i.e. the returning light pulse or reflected light pulse representative of the reflection of the transmitted light pulse at the target). The distance measurement is derived from the time difference δt=t2−t1. Time t3 is the emission time of a transmit light signal 215 of a following measurement. The time difference t3−t1 is the transmit light signal repetition interval.

Although the example of FIG. 2 shows the times t1 and t2 and t3 at the peaks of respective return light pulses, the receive time of return light can be determined in other ways, such as a threshold of a leading edge or a computed center of gravity of a pulse or set of pulses or other characteristic of the return light signal.

Figure 3:
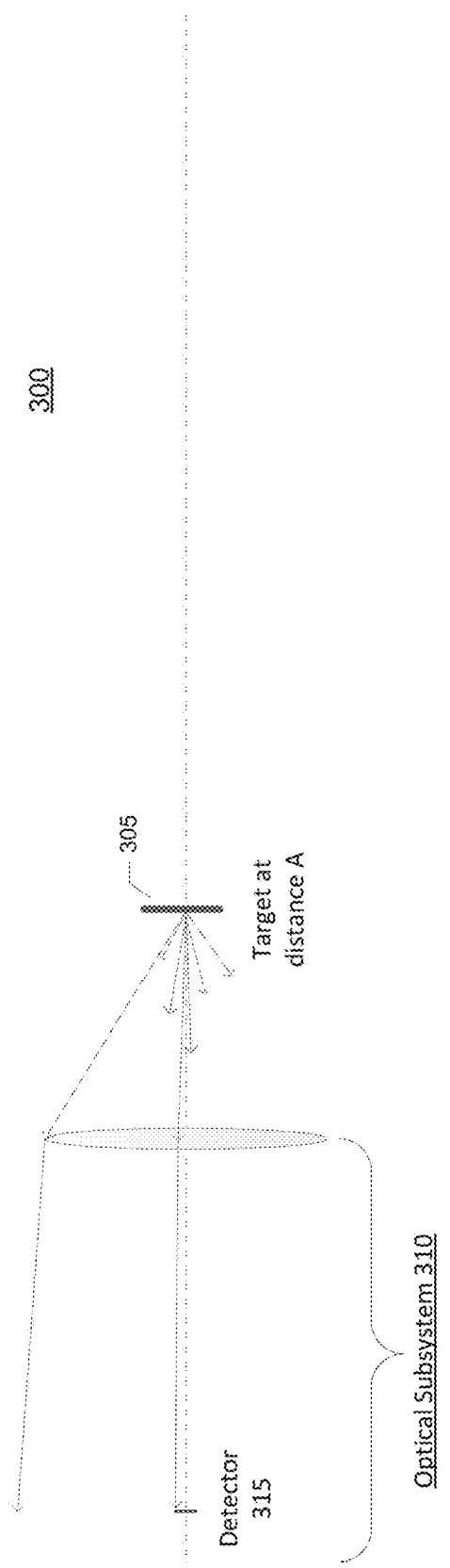
FIG. 3 schematically illustrates the return light signal from a target at a first distance.

FIG. 3 schematically illustrates at 300 the return light signal from a target 305 at distance A from the optical subsystem 310. A large part of the transmit light signal that is reflected from the target at distance A is collected by the optical subsystem 310, but only a small part of that light reaches the detector 315.

Figure 4:
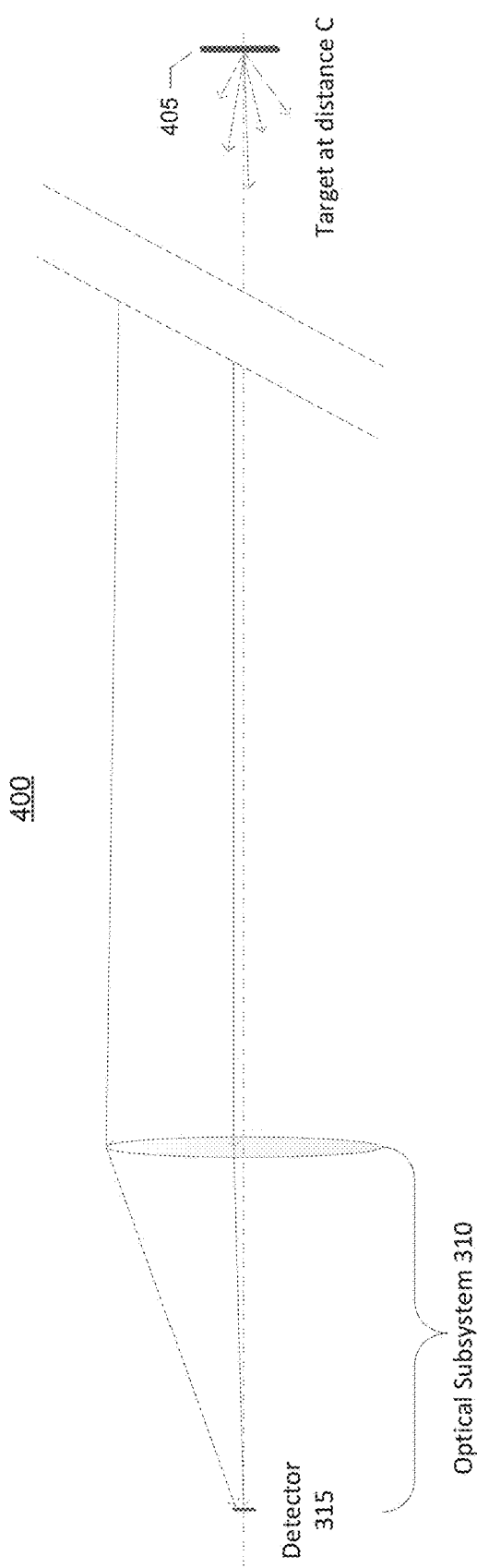
FIG. 4 schematically illustrates the return light signal from a target at a second distance.

FIG. 4 schematically illustrates at 400 the return light signal from a target 405 at distance C from the optical subsystem 310. A small part of the transmit light signal that is reflected from the target at distance C is collected by the optical subsystem 310, but a large part of that light reaches the detector 315.

Figure 5:
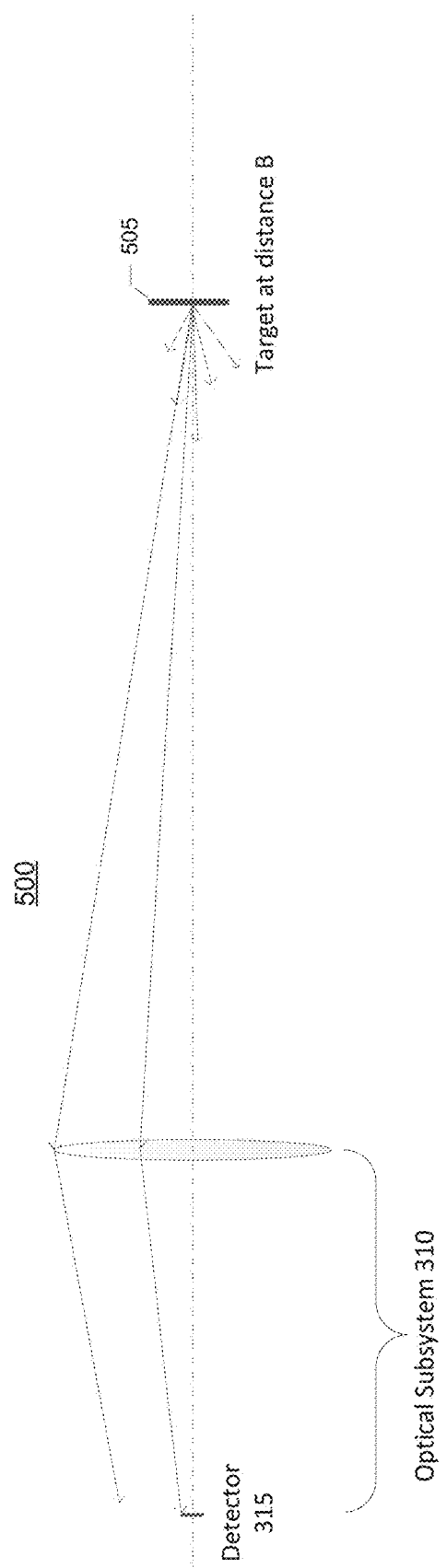
FIG. 5 schematically illustrates the return light signal from a target at a third distance.

FIG. 5 schematically illustrates at 500 the return light signal from a target 505 at distance B from the optical subsystem 310. Distance B is greater than distance A and less than distance C. The amount of the transmit light signal that is reflected from the target at distance B and reaches detector 315 is at a maximum with the target at distance B.

Figure 6:
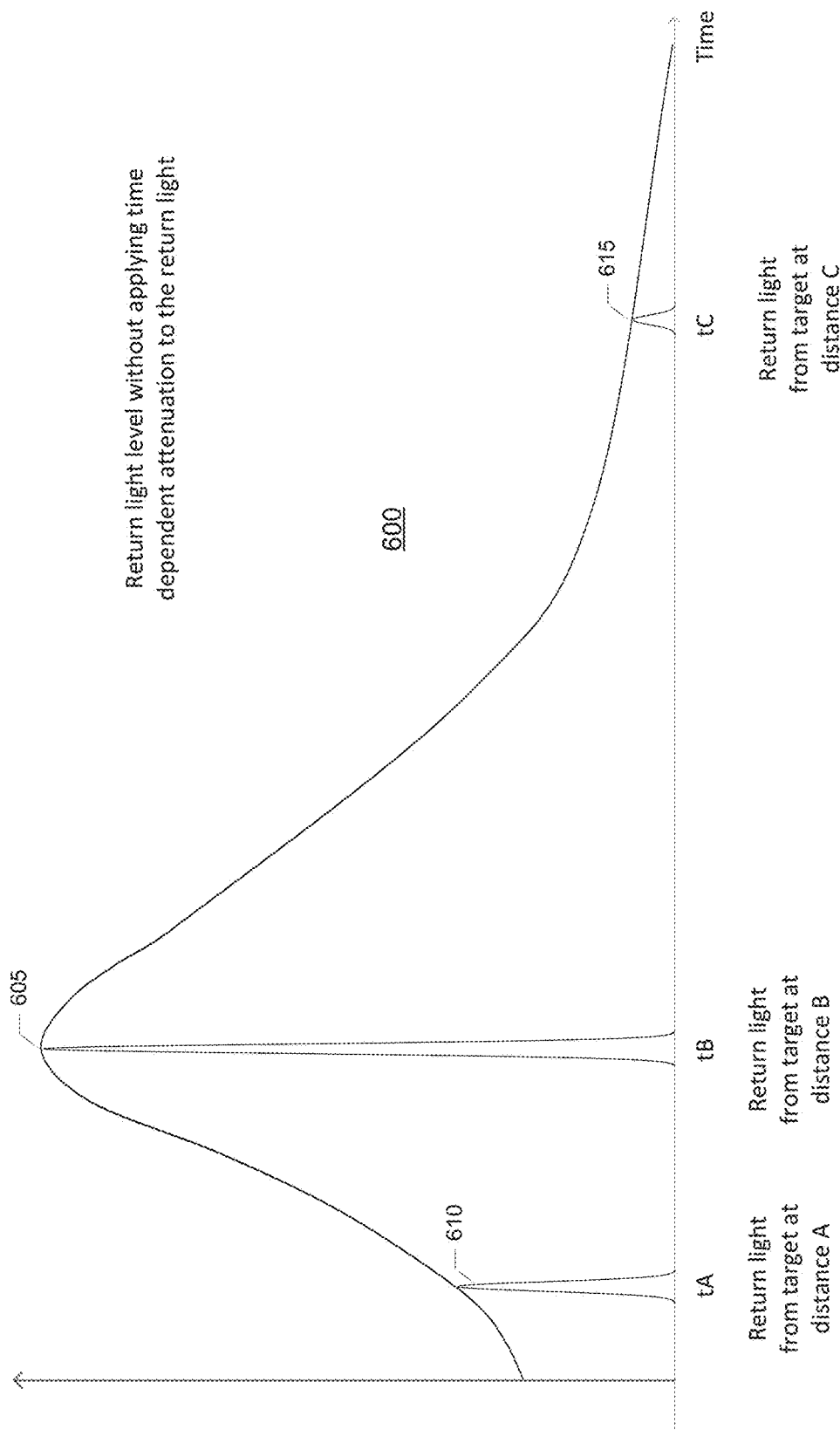
FIG. 6 shows the level of return light from a target as a function of time.

FIG. 6 shows at 600 the level of return light from a target, without applying time-dependent attenuation to the return light signal or the return electrical signal, as a function of time following emission of transmit light. The level 605 of return light from a target at distance B is at a maximum, corresponding to the arrangement of FIG. 5. The level 610 of return light from a target at distance A is less than that from a target at distance B, corresponding to the arrangement of FIG. 3. The level 615 of return light from a target at distance C is also less than that from a target at distance B, corresponding to the arrangement of FIG. 4.

Figure 7:
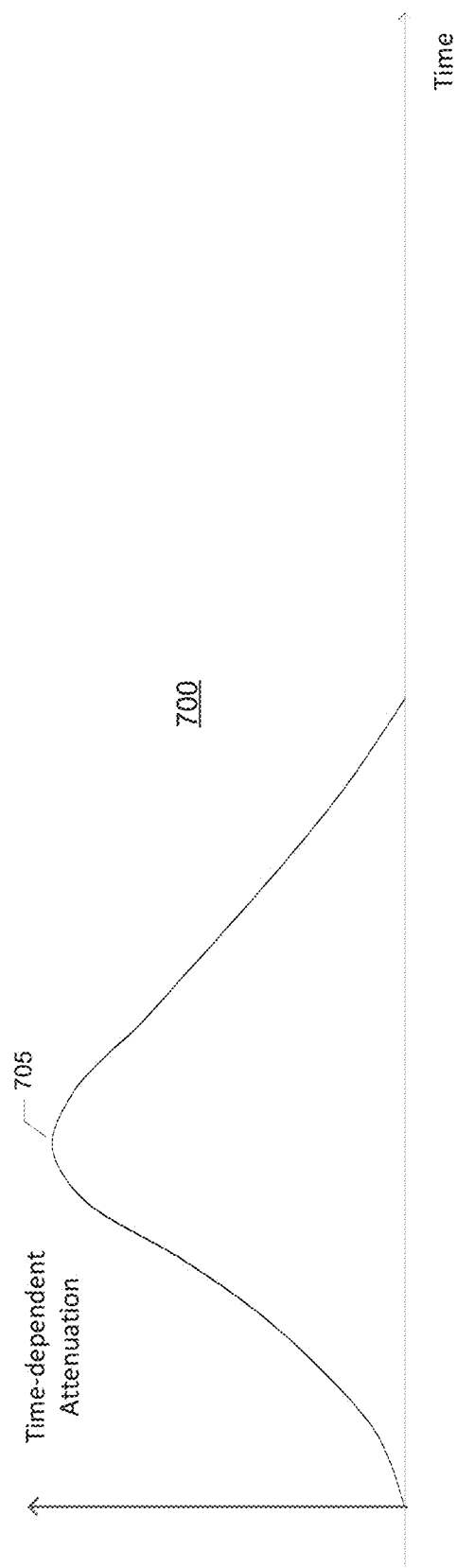
FIG. 7 shows a time-dependent attenuation function as a function of time in accordance with some embodiments of the invention.

FIG. 7 shows at 700 a desired time-dependent attenuation function 705 as a function of time following emission of transmit light. Applying such time-dependent attenuation can substantially reduce dynamic range of the return light and/or the electrical signal resulting from detection of the return light.

According to some embodiments, the distance measurement system or apparatus 100 may be equipped with an attenuator (not shown in FIG. 1 but in FIGS. 9-12 according to various possible configurations) which is configured to apply an attenuation to at least one of the return light signal and the return electrical signal. Referring to FIG. 7, the attenuation varies (or the attenuation level of the attenuator is regulated), as time passes, after emission of the transmit light signal, according to a time-dependent attenuation function such that the attenuation is maximum at a critical time elapsed since the emission time of the transmit light signal.

FIG. 7 shows an attenuation function wherein the attenuation increases as a function of time from the emission time of the transmit light signal (or from any time event related to the emission time of the transmit light signal) up to the critical time. After the critical time, the attenuation decreases as a function of time.

The critical time is dependent on at least geometrical parameters of the optical subsystem of the receiving system. Referring again to FIG. 5, the critical time corresponds to a light travel distance (B) for which a maximum amount of light is obtained at the detector 315 of the optical subsystem, i.e. the distance for which the amount of the transmit light signal that is reflected from the target and reaches the detector 315 is maximum.

As schematically illustrated in FIGS. 1 and 3-5, an optical element such as a lens may be arranged at the first aperture to direct the return light signal reaching the optical subsystem 150, 310 at the detector 160, 315.

Figure 8:
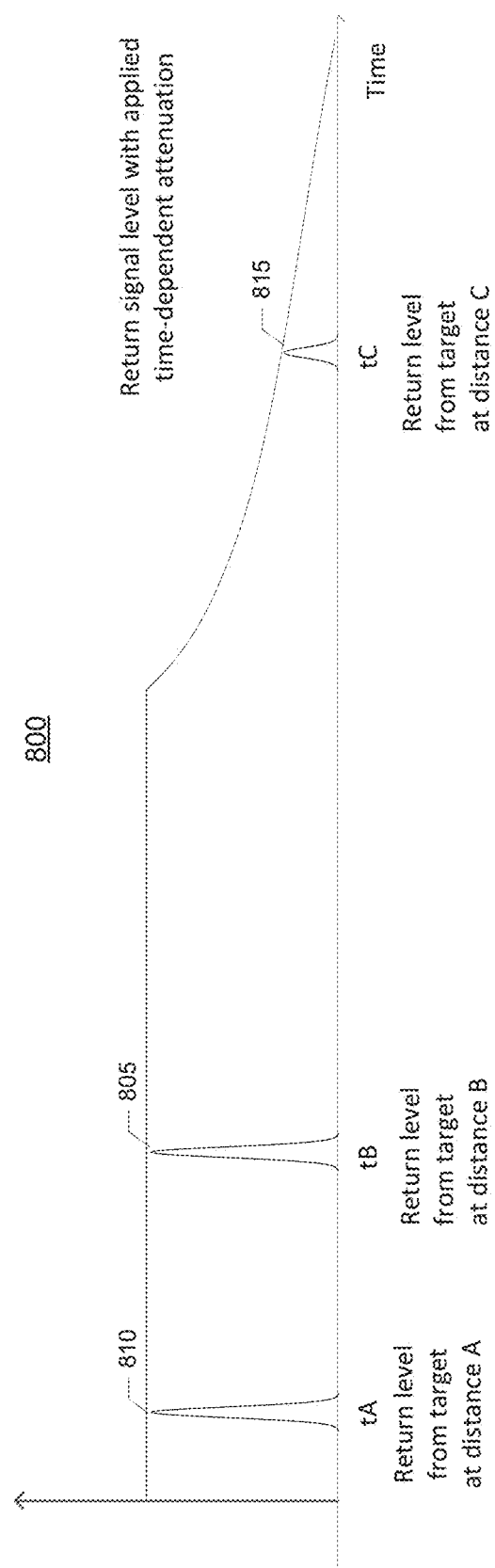
FIG. 8 shows the return signal level with applied time-dependent attenuation as a function of time.

FIG. 8 shows at 800 the return signal level with applied time-dependent attenuation 705 as a function of time following emission of transmit light. The attenuation is applied to the return light and/or to the electrical signal resulting from detection of the return light, as explained with reference to the examples below. The return signal level 805 from a target at distance B is substantially the same as the return signal level 810 from a target at distance A. The return signal level 815 from a target at distance C is unaffected because the attenuation is minimal at the time corresponding to distance C.

Figure 9:
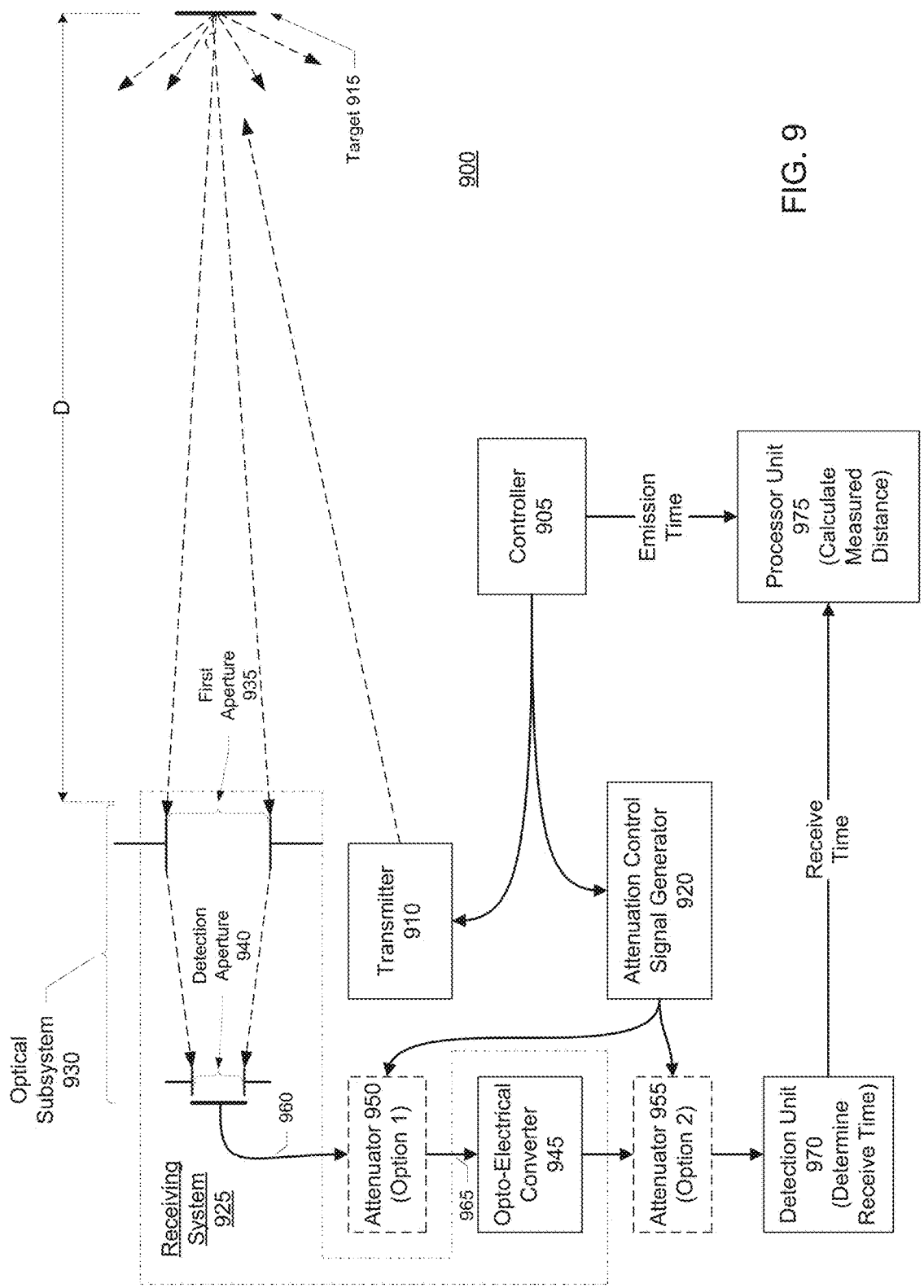
FIG. 9 shows a schematic diagram of an apparatus for measuring distance in accordance with some embodiments of the invention.

FIG. 9 shows a schematic diagram of an apparatus 900 for measuring distance in accordance with some embodiments of the invention. The apparatus 900 includes a transmitter operative to emit a transmit light signal toward a target 915 at an emission time. Target 915 does not form a part of the apparatus 900.

The apparatus 900 may include a controller 905 and an attenuation control signal generator 920 responsive to the controller 905 to produce at least one time-dependent attenuation control signal related in time to the emission time.

A receiving system 925 of apparatus 900 includes an optical subsystem 930 having a first aperture 935 and a detection aperture 940.

The amount of light reaching the first aperture 935 from the target may be described by a first function dependent on distance D between the first aperture and the target. The first function is, for example, as shown in FIG. 10A.

Figure 10A:
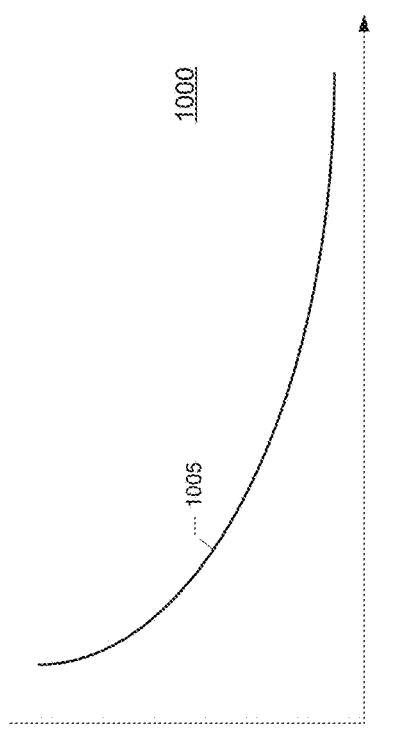
FIG. 10A shows an example of a first function relating the amount of light reaching the first aperture of FIG. 9 to distance D between the first aperture and a target.

FIG. 10A shows an example of a first function relating the amount of light reaching the first aperture 935 to distance D between the first aperture 935 and the target. The first function is, for example, a $1/d^2$ relationship.

The amount of light passing through the first aperture 935 and reaching the detection aperture 940 without applied attenuation may be described by a second function dependent on distance D between the first aperture 935 and the target. The second function is, for example, as shown in FIG. 10B.

Figure 10B:
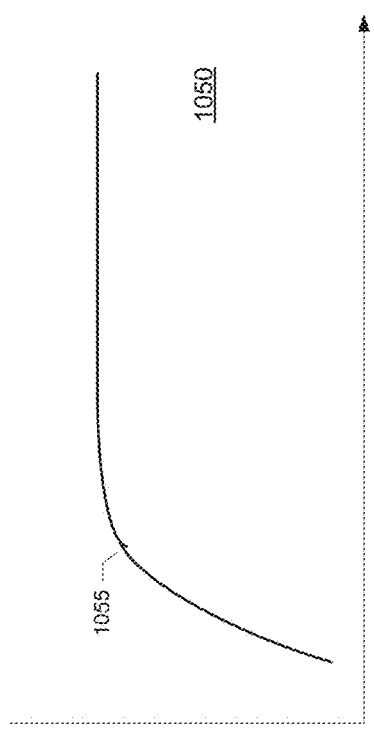
FIG. 10B shows an example of a second function relating the amount of light passing through the first aperture and reaching the detection aperture of FIG. 9 to distance D between the first aperture and a target.

FIG. 10B shows an example of a second function relating the amount of light passing through the first aperture 935 and reaching the detection aperture 940, without applied attenuation, to distance D between the first aperture 935 and the target. In some embodiments the second function may be determined by design parameters of the optical subsystem 930, such as the sizes of the first aperture 935 and the second aperture 940 and the spacing between the first aperture 935 and the second aperture 940.

Receiving system 925 further includes an opto-electrical converter 945 to convert a return light signal to a return electrical signal.

The apparatus 900 includes at least one attenuator, such as an optional optical attenuator 950 and/or an optional electrical attenuator 955. Each attenuator 950, 955 is configured to apply an attenuation to at least one of the return light signal and the return electrical signal, respectively. The attenuation is regulated, as time passes, after emission of the transmit light signal (or light pulse). The attenuation varies according to a time-dependent attenuation function such that the attenuation is maximum at the critical time.

For this purpose, each attenuator 950, 955 may be responsive to a control signal from the attenuation control signal generator 920. Attenuation is applied to the return light signal by optical attenuator 950 and/or to the return electrical signal by electrical attenuator 955, to obtain an attenuated electrical signal that is compensated for a combination of at least the first function and the second function. The return light signal may be conveyed to opto-electrical converter 940 by one or more suitable optical elements 960, 965, such as optical fibers.

FIG. 9 depicts several optional configurations. A first configuration is to use an optical attenuator 950 to compensate the return light signal for the first function and the second function, before the return light signal reaches opto-electrical converter 945. Opto-electrical converter 945 then produces a return electrical signal that is compensated for the first function and the second function.

A second configuration is to use an electrical attenuator 955 to compensate the return electrical signal for the first function and the second function, after the opto-electrical converter 945 has converted the return light signal to a return electrical signal.

A third configuration is to use an optical attenuator 950 to compensate the return light signal for a portion of the first function and the second function, before the return light signal reaches opto-electrical converter 945, and to compensate the return electrical signal for the remainder of the first function and the second function, after the opto-electrical converter 945 has converted the attenuated return light signal from optical attenuator 950 to a partially-attenuated return electrical signal.

That is, compensation for the first function and the second function is performed entirely by optical attenuator 950, entirely by electrical attenuator 955, or partially by optical attenuator 950 and partially by electrical attenuator 955.

A detection unit 970 determines a receive time from the return electrical signal (or the attenuated electrical signal) using a suitable technique, such as a threshold of a leading edge or a computed center of gravity of a pulse or set of pulses or other characteristic of the return light signal.

The determined receive time is supplied to a processor unit 975. Processor unit 975 also receives an emission time of the transmit light signal corresponding to the receive light signal. Processor 975 is in some embodiments a time-of-flight processor such as TOF processor 145 of FIG. 1. The emission time is determined from an emission reference, or from a transmit command, as described with reference to FIG. 1, or by other suitable means.

Processor unit 975 calculates a measured distance based on at least the emission time and the receive time. Other parameters are optionally included in the measured distance calculation, such as delay and/or distortion caused by conversion of the return light signal to a return electrical signal, by electrical attenuation, by electrical or electronic elements, and by environmental effects such as ambient temperature or ambient humidity.

The embodiment of FIG. 9 shows attenuation applied to the return light signal and/or to the return electrical signal. These and other configurations are illustrated in FIG. 11A, FIG. 11B, FIG. 11C and FIG. 11D.

Figure 11B:
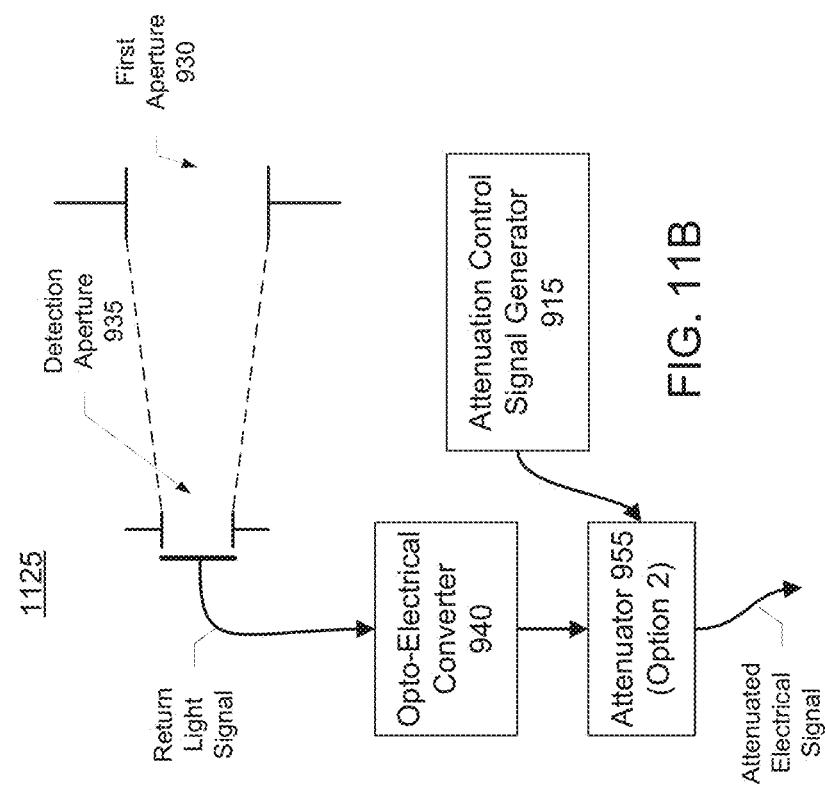
FIG. 11B shows a second attenuation configuration in accordance with an embodiment of the invention.
Figure 11A:
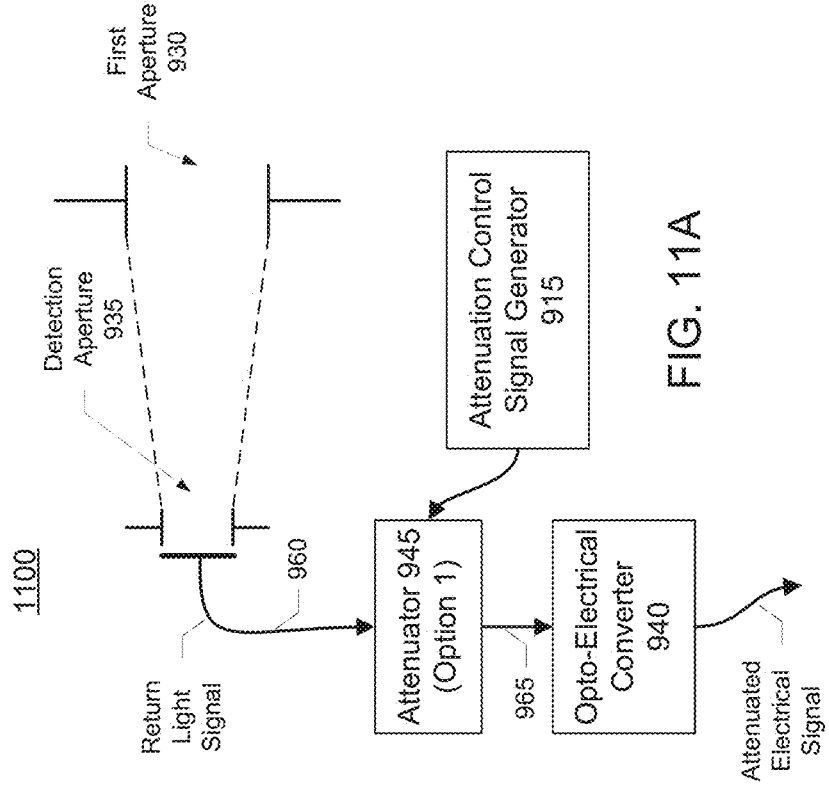
FIG. 11A shows a first attenuation configuration in accordance with an embodiment of the invention.

FIG. 11A shows the first configuration described with reference to FIG. 9. Optional attenuator 945 is responsive to an attenuation control signal from attenuation control signal generator 915 to apply attenuation to the return light signal.

FIG. 11B shows the second configuration described with reference to FIG. 9. Optional attenuator 955 is responsive to an attenuation control signal from attenuation control signal generator 915 to apply attenuation to the return electrical signal.

FIG. 11C shows a further configuration. In this embodiment, optional optical attenuator 1155 is responsive to an attenuation control signal from attenuation control signal generator 915 to apply attenuation to the return light between first aperture 930 and detection aperture 935.

FIG. 11D shows another configuration. In this embodiment, optional optical attenuator 1180 is responsive to an attenuation control signal from attenuation control signal generator 915 to apply attenuation to the return light before the return light enters aperture 930.

Some embodiments use a combination of any two or more of the configurations of FIG. 11A, FIG. 11B, FIG. 11C and FIG. 11D for attenuation of either one or both of the return light signal and the return electrical signal.

Figure 12:
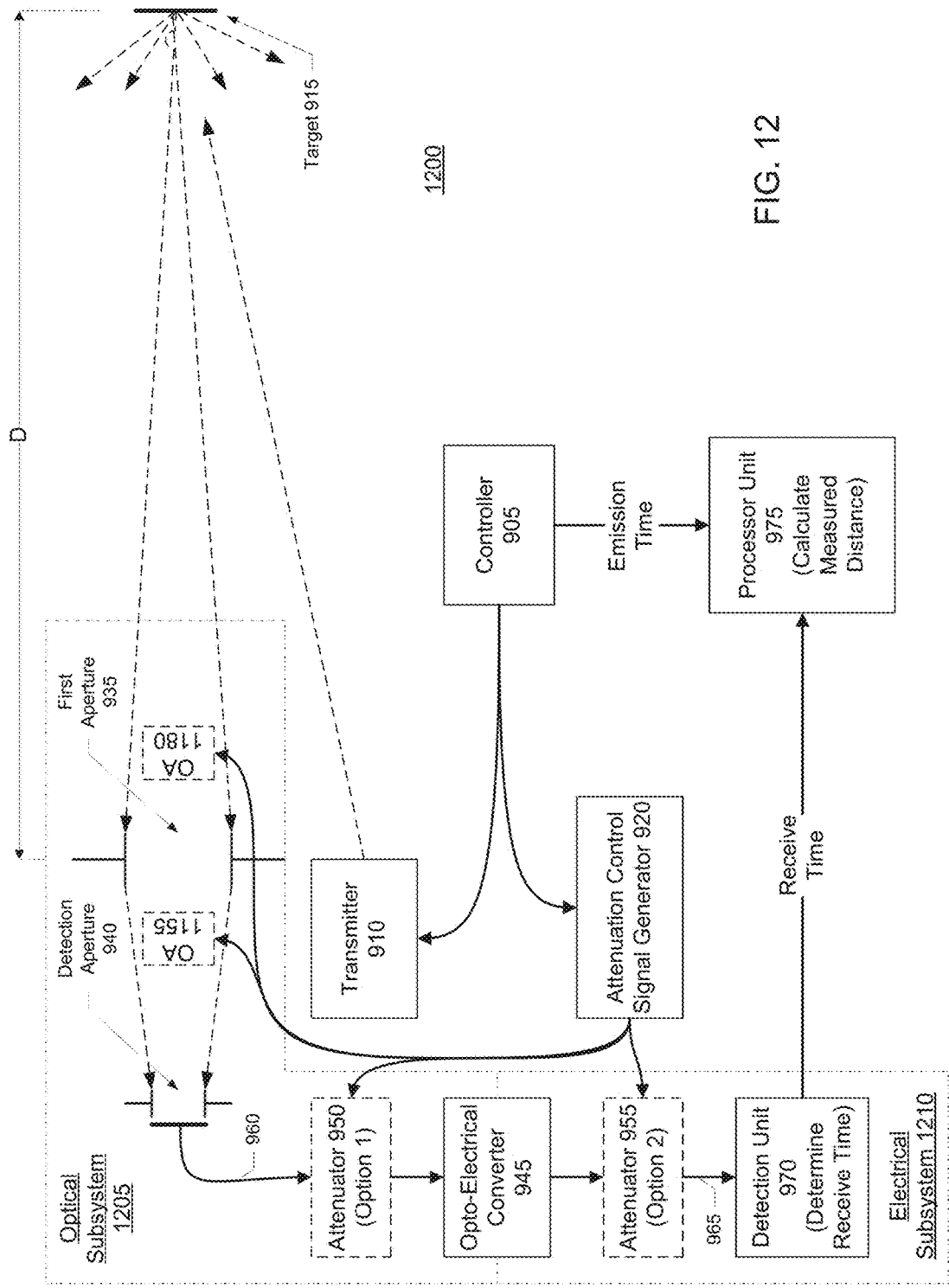
FIG. 12 shows a schematic diagram of an apparatus for measuring distance in accordance with some embodiments of the invention.

FIG. 12 shows such a combination, with optional optical attenuators 950, 1155, 1180 in an optical subsystem 1205, and with optional attenuator 955 in an electrical subsystem 1210. One or more of attenuators 950, 1155, 1180 and 955 is used to attenuate either one or both of the return electrical signal and the return light signal.

Figure 13:
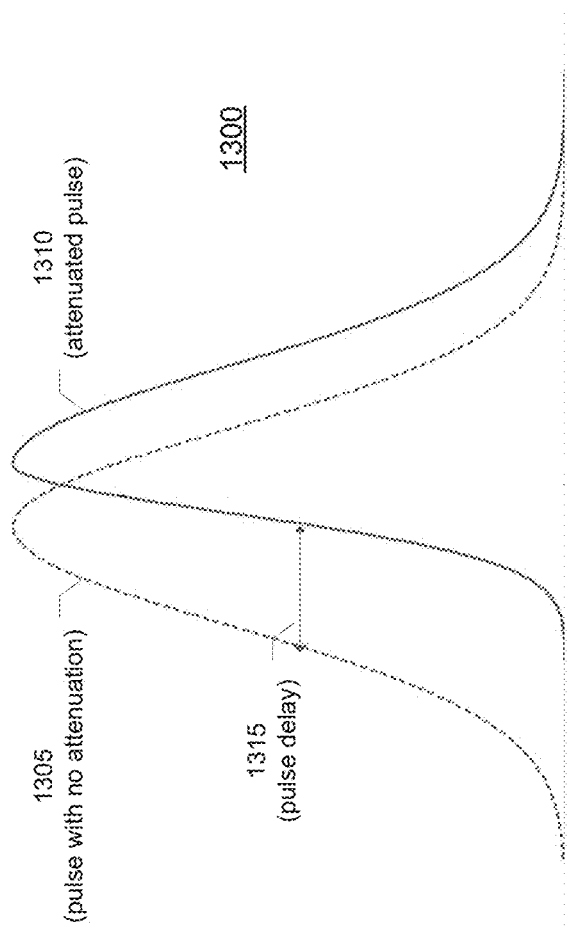
FIG. 13 illustrates distortion in the attenuated electrical signal due to applied attenuation.

FIG. 13 illustrates distortion in the return electrical signal due to the applied attenuation. In this example, a pulse 1305 in an ideal system is shown as a function of time, with no attenuation applied. The resulting pulse 1310 when attenuation is applied is distorted (e.g., pulse shape has changed) and/or delayed as indicated by arrow 1315.

Figure 14:
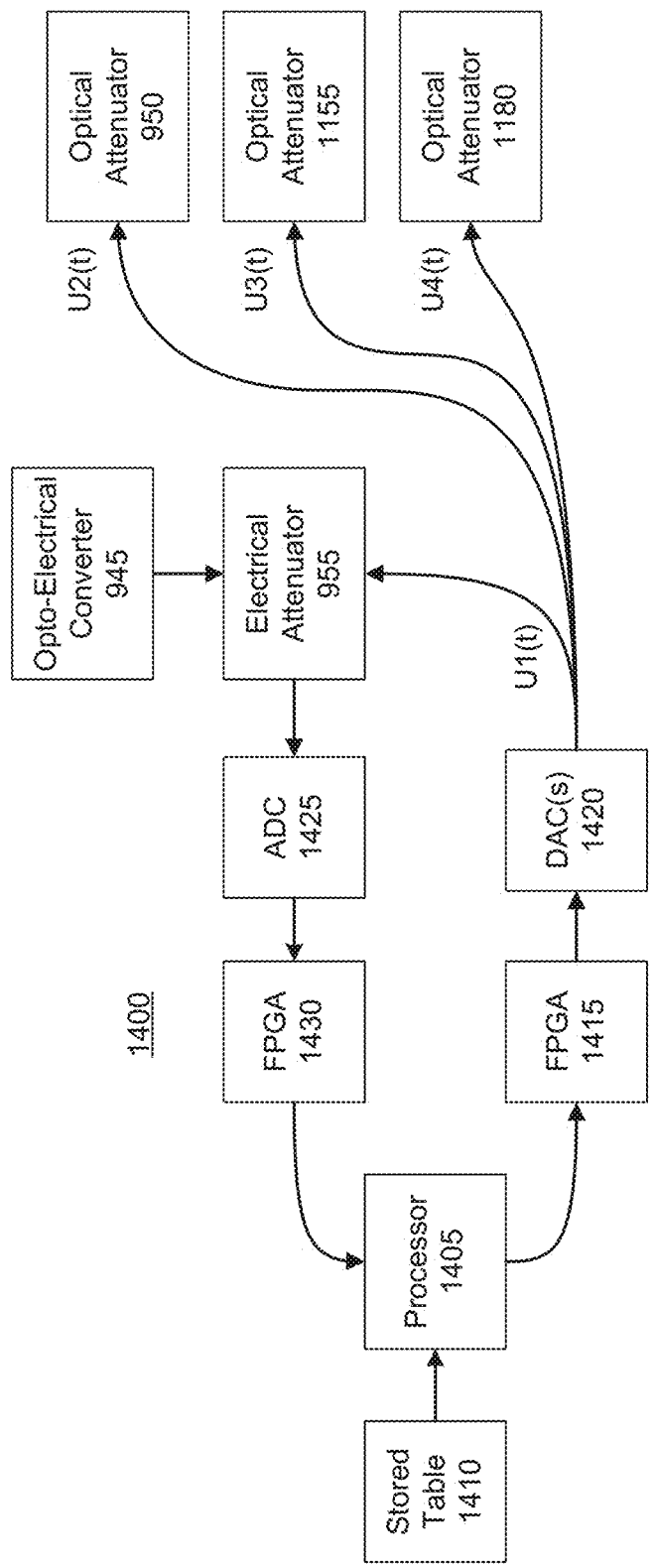
FIG. 14 is a schematic diagram of the electronics portion of a receiving system in accordance with some embodiments of the invention.

FIG. 14 is a schematic diagram 1400 of the electronics portion of a receiving system 925. Receiving system 925 is controlled by a processor 1405. In some embodiments, processor 1405 also serves as a system controller unit 105 and/or as processor unit 975 to calculate measured distances.

Processor 1405 loads a stored table 1410 having an attenuation value for each of a sequence of time increments, representing the desired time-dependent attenuation function. The attenuation function can be changed from one measurement to the next with such an arrangement, though the degree of change may be limited by circuitry response times.

A field-programmable gate array (FPGA) 1415 retrieves each attenuation value from the table 1410 in sequence. Each attenuation value is converted by digital-to-analog converter (DAC) 1420 to one or more attenuation control signals U1(t), U2(t), U3(t), U4(t), each of which is used to set the attenuation level of a respective variable attenuator 955, 950, 1155, 1180.

Opto-electrical converter 945 converts the return light signal to a return electrical signal. Variable electrical attenuator 955 attenuates the return electrical signal and/or the return light signal is attenuated by one or more of optical attenuators 950, 1155, 1180.

The resulting attenuated electrical signal is converted by analog-to-digital converter (ADC) 1425 to a time series of digital values. FPGA 1430 determines the receive time of the return light signal.

FPGA 1415 and FPGA 1430 are shown as separate items in FIG. 14, but their functionality can be performed in a single device or distributed over multiple devices if desired.

In some embodiments, the values of table 1410 account for ambient temperature and/or ambient moisture. In some embodiments, a table is provided for each of a plurality of ranges of ambient temperature and/or ambient moisture, e.g., by calibration of the apparatus prior to making a distance measurement in the field. Ambient temperature and/or ambient moisture is determined in the field from user input or local sensor data and/or weather information retrieved from a remote source.

In some embodiments the values of table 1410 are determined by calibration prior to making measurements in the field. For this purpose, the distance measurement system may be equipped with a calibration unit for calibration of the optical subsystem. The calibration may be performed in factory or in the field.

Figure 15A:
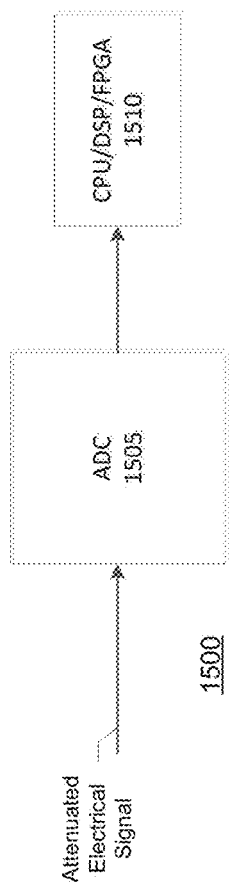
FIG. 15A shows a first example of a detection unit in accordance with some embodiments of the invention.

FIG. 15A shows at 1500 a first example of a detection unit 970 for determining a receive time from the (attenuated) return electrical signal. An ADC 1505 digitizes the return electrical signal and passes the resulting data to a processor 1510 such as a central processing unit (CPU), a digital signal processor (DSP) or a field programmable gate array (FPGA). Processor 1510 determines the receive time from the data.

Figure 15B:
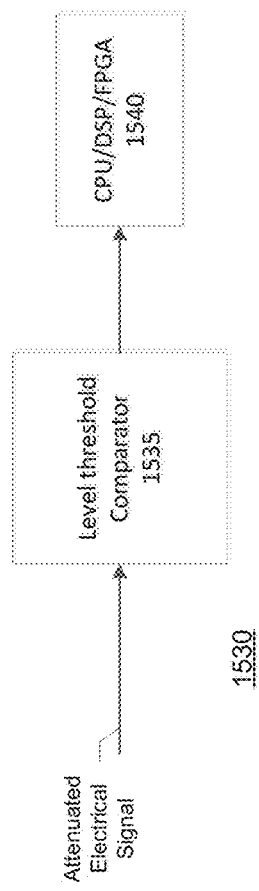
FIG. 15B shows a second example of a detection unit in accordance with some embodiments of the invention.

FIG. 15B shows at 1530 a second example of a detection unit 970 for determining a receive time from the return electrical signal. A level threshold comparator 1535 compares the return electrical signal with a threshold to indicate when the return electrical signal exceeds a predetermined threshold, and passes the result to a processor 1540 such as a CPU, DSP or FPGA. Processor 1540 determines the receive time from the threshold indication.

Figure 15C:
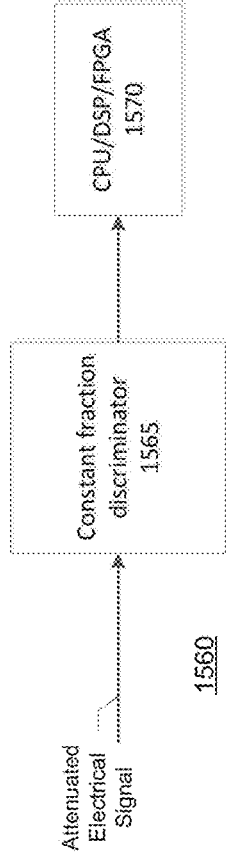
FIG. 15C shows a third example of a detection unit in accordance with some embodiments of the invention.

FIG. 15C shows at 1560 a third example of a detection unit 970 for determining a receive time from the return electrical signal. A constant-fraction discriminator 1565 determines a maximum level of the return electrical signal by finding the time when its slope is at zero. Processor 1570 determines the receive time from the time when the slope is at zero.

Figure 16:
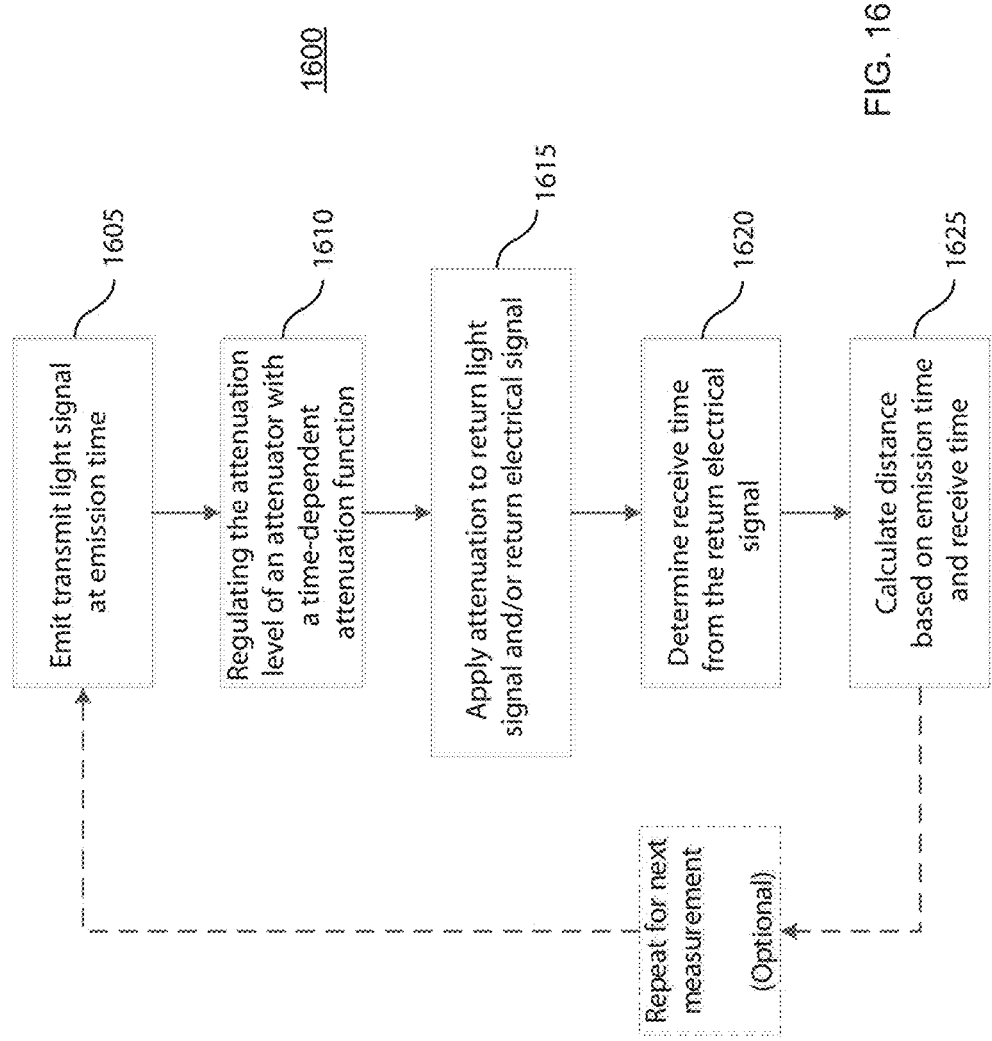
FIG. 16 shows a flow chart of a method of operating a distance measuring system in accordance with some embodiments of the invention.

FIG. 16 shows at 1600 a flow chart of a method of operating a distance measuring system in accordance with some embodiments of the invention.

At step 1605 a transmit light signal is emitted toward a target at an emission time. At step 1610 the attenuation level of an attenuator for attenuation is regulated according to a time-dependent attenuation function. At step 1615 the attenuation is applied to at least one of a return light signal (which corresponds to the reflection of the light transmit signal at the target) and a return electrical signal (which corresponds to the electrical conversion of the return light signal).

At step 1620 a receive time is determined from the return electrical signal. At step 1625 a measured distance based on at least the emission time and the receive time is calculated. The process optionally returns at step 1625 to repeat steps 1605-1625 for a subsequent measurement.

In some embodiments, at least one time-dependent attenuation control signal related in time to the emission time may be produced to control the attenuation level of the attenuator.

The method described with reference to FIG. 16 may be combined with any feature or embodiment of the apparatus or distance measurement system described with reference to FIGS. 1-15.

Reference is made in detail to implementations of the present invention as illustrated in the accompanying drawings. The same reference indicators are used throughout the drawings and the following detailed description to refer to the same or like parts.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. Portions of the methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements can be readily implemented using an object-oriented programming language such that each required element is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented in part on a data processing computer such as a portable computing device, personal computer, workstation computer, mainframe computer, or high-performance server running an operating system. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Any of the above-described methods and their embodiments may be implemented in part by means of a computer program. The computer program may be loaded on an apparatus as described above. Therefore, the invention also relates to a computer program, which, when carried out on an apparatus performs portions of any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update that can be installed on apparatus already in the field, i.e. a computer program delivered to the field as a computer program product. This applies to each of the above-described methods and apparatuses.

Although embodiments of the present invention are described on the basis of detailed examples, the detailed examples only serve to provide the skilled person with a better understanding, and are not intended to limit the scope of the invention. The scope of the invention is much rather defined by the appended claims.

The invention claimed is:

1. Apparatus for measuring distance, comprising:
a transmitter operative to emit a transmit light signal toward a target at an emission time,
a receiving system comprising:
an optical subsystem to receive a return light signal, and
an opto-electrical converter to convert the return light signal to a return electrical signal,
at least one attenuator to apply an attenuation to at least one of the return light signal and the return electrical signal, the attenuation varying, as time passes, after emission of the transmit light signal, according to a time-dependent attenuation function such that the attenuation is maximum at a critical time elapsed since the emission time of said transmit light signal, said critical time being dependent on at least one geometrical parameter of the optical subsystem,
a detection unit to determine a receive time from the return electrical signal, and
a processor unit to calculate a measured distance based on at least the emission time and the receive time.

2. The apparatus of claim 1, wherein the optical subsystem includes a first aperture and a detection aperture, the critical time being dependent on at least one of a size of the first aperture, a size of the detection aperture and a distance from the first aperture to the detection aperture.

3. The apparatus of claim 2, wherein an optical element is arranged at the first aperture to direct the return light signal on a detector arranged at the detection aperture.

4. The apparatus of claim 1, wherein the critical time corresponds to a light travel distance for which a maximum amount of light is obtained at a detection aperture of the optical subsystem.

5. The apparatus of claim 1, further comprising a calibration unit for determining the critical time during a calibration procedure.

6. The apparatus of claim 1, wherein the attenuator is configured such that the attenuation of said at least one of the return light signal and the return electrical signal decreases after the critical time.

7. The apparatus of claim 1, further comprising a controller configured to regulate the attenuation of said attenuator for a travelling transmit light signal, as time passes, from a time event related to the emission of the travelling transmit light signal until reception of the return light signal corresponding to said travelling transmit light signal or until emission of a subsequent transmit light signal or until a time period elapsed since said time event exceeds a threshold.

8. The apparatus of claim 2, wherein the amount of light reaching the first aperture from the target is described by a first function dependent on distance between the first aperture and the target, and an amount of light passing through the first aperture reaching the detection aperture without applied attenuation is described by a second function dependent on distance between the first aperture and the target, wherein the apparatus further comprises a compensation element to reduce influence of at least one of the first function and the second function on the return electrical signal.

9. The apparatus of claim 1, wherein the processor unit is operative to correct at least one of the receive time and the measured distance for a time shift of the receive time resulting from appliance of the attenuation on at least one of the return light signal and the return electrical signal by the attenuator.

10. The apparatus of claim 1, further comprising
   a. a signal delay module operative to delay a portion of the return electrical signal for a predetermined time,
   b. a signal analyzer operative to generate an intensity signal indicative of an intensity of the return electrical signal, and
   c. a variable gain amplifier operative to amplify the delayed portion of the return electrical signal using a gain dependent on the intensity signal,
wherein the detection unit is operative to determine the receive time from the return electrical signal by determining the receive time from the delayed portion of the return electrical signal after amplification by the variable gain amplifier.

11. The apparatus of claim 1, wherein the attenuation function is modified for a current distance measurement using information from a previous distance measurement, and wherein the critical time corresponds to a critical distance to the target of approximately 15 to 75 meters.

12. A method of operating a distance measuring system, comprising:
   a. emitting a transmit light signal toward a target at an emission time,
   b. receiving by an optical subsystem a return light signal
   c. converting the return light signal to a return electrical signal,
   d. regulating, as time passes, after emission of the transmit light signal, an attenuation level of an attenuator for applying an attenuation to at least one of the return light signal and the return electrical signal according to a time-dependent attenuation function such that the attenuation is maximum at a critical time elapsed since the emission time of said transmit light signal, said critical time being dependent on at least one geometrical parameter of the optical subsystem,
   e. determining a receive time from the return electrical signal, and
   f. calculating a measured distance based on at least the emission time and the receive time.

13. The method of claim 12, wherein the optical subsystem includes a first aperture and a detection aperture, the critical time being dependent on at least one of a size of the first aperture, a size of the detection aperture and a distance from the first aperture to the detection aperture.

14. The method of claim 12, wherein the critical time corresponds to a light travel distance for which a maximum amount of light is obtained at a detection aperture of the optical subsystem.

15. The method of claim 12, wherein the attenuation increases between the emission time of said transmit light signal up to said critical time.

16. The method of claim 12, further comprising calibrating said distance measuring system for determining the critical time.

17. The method of claim 12, wherein the attenuation of said at least one of the return light signal and the return electrical signal decreases after the critical time.

18. The method of claim 12, wherein the attenuation is regulated for a travelling transmit light signal, as time passes, after emission of the travelling transmit light signal until reception of the return light signal corresponding to said travelling transmit light signal or until emission of a subsequent transmit light signal or until a time elapsed since the emission time exceeds a threshold.

19. The method of claim 12, wherein applying the attenuation function results in a time shift of the receive time, and the method further comprises correcting at least one of the receive time and the measured distance for the time shift.

20. The method of claim 12, further comprising
   a. delaying a portion of the attenuated electrical signal for a predetermined time,
   b. generating an intensity signal indicative of an intensity of the attenuated electrical signal, and
   c. amplifying the delayed portion of the attenuated electrical signal using a gain dependent on the intensity signal,
wherein determining the receive time from the attenuated electrical signal comprises determining the receive time from the delayed portion of the attenuated electrical signal after amplification by the variable gain amplifier.

* * * * *